United States Patent
Ghanwani et al.

(10) Patent No.: US 9,548,872 B2
(45) Date of Patent: Jan. 17, 2017

(54) REDUCING INTERNAL FABRIC CONGESTION IN LEAF-SPINE SWITCH FABRIC

(71) Applicant: DELL PRODUCTS L.P., Round Rock, TX (US)

(72) Inventors: Anoop Ghanwani, Rocklin, CA (US); Shivakumar Sundaram, Chennai (IN)

(73) Assignee: DELL PRODUCTS, LP, Round Rock, TX (US)

( * ) Notice: Subject to any disclaimer, the term of this patent is extended or adjusted under 35 U.S.C. 154(b) by 106 days.

(21) Appl. No.: 14/497,869

(22) Filed: Sep. 26, 2014

(65) Prior Publication Data
US 2016/0094450 A1 Mar. 31, 2016

(51) Int. Cl.
| G06F 11/00 | (2006.01) |
| H04J 1/16 | (2006.01) |
| H04L 1/00 | (2006.01) |
| H04L 12/26 | (2006.01) |
| H04L 12/44 | (2006.01) |
| H04L 12/911 | (2013.01) |
| H04L 12/825 | (2013.01) |
| H04L 12/933 | (2013.01) |

(52) U.S. Cl.
CPC .......... H04L 12/44 (2013.01); H04L 43/0894 (2013.01); H04L 47/25 (2013.01); H04L 47/821 (2013.01); H04L 49/10 (2013.01)

(58) Field of Classification Search
CPC .......... H04L 12/44; H04L 49/10; H04L 47/25; H04L 43/0894; H04L 47/821
USPC .......... 370/419, 412, 230–235, 229
See application file for complete search history.

(56) References Cited

U.S. PATENT DOCUMENTS

| 6,633,585 | B1 | 10/2003 | Ghanwani et al. | |
| 9,008,095 | B2* | 4/2015 | Kapadia | H04L 45/745 370/351 |
| 9,397,946 | B1* | 7/2016 | Yadav | H04L 41/0806 |
| 2008/0117813 | A1* | 5/2008 | Hwang | H04L 12/5695 370/230 |
| 2013/0070588 | A1* | 3/2013 | Steele | H04L 49/90 370/230 |
| 2013/0182716 | A1* | 7/2013 | Gemelli | H04L 49/1523 370/419 |
| 2014/0092901 | A1* | 4/2014 | Kapadia | H04L 45/745 370/390 |
| 2014/0140244 | A1* | 5/2014 | Kapadia | H04L 61/103 370/255 |
| 2014/0153388 | A1* | 6/2014 | Webb | H04L 47/20 370/230 |

(Continued)

*Primary Examiner* — Chuong T Ho
(74) *Attorney, Agent, or Firm* — North Weber & Baugh LLP

(57) ABSTRACT

Embodiments of the present invention provide methods and system to reduce needless data traffic in leaf-spine switch fabric. In embodiments, in a static solution, data rates of data flows having a common destination port may be measured and responsive to the data flows having a combined data rate that exceeding a rate limit of the common destination port, one or more of the data flows may be limited. Embodiments may also comprise a global scheduler to provide dynamic data rate controls of traffic flows from source ports to destination ports in which to reduce the handling of data traffic that would otherwise be discarded due to oversubscription.

20 Claims, 8 Drawing Sheets

100A

MEASURE, AT A LEAF NODE, DATA RATES OF ONE OR MORE DATA FLOWS RECEIVED AT ONE OR MORE PORTS FROM A PLURALITY OF PORTS, THE ONE OR MORE DATA FLOWS HAVING A COMMON DESTINATION PORT AT A SECOND LEAF NODE — 110

RESPONSIVE TO A COMBINED DATA RATE OF THE FIRST ONE MORE DATA FLOWS EXCEEDING A RATE LIMIT OF THE COMMON DESTINATION PORT AT A SECOND IHS, LIMIT EGRESS OF THE ONE OR MORE DATA FLOWS FROM THE LEAF NODE BASED ON THE RATE LIMIT OF THE COMMON DESTINATION PORT — 120

(56) References Cited

U.S. PATENT DOCUMENTS

2014/0195630 A1\* 7/2014 Malik ................ H04L 49/9063
709/212

\* cited by examiner

100A

MEASURE, AT A LEAF NODE, DATA RATES OF ONE OR MORE DATA FLOWS RECEIVED AT ONE OR MORE PORTS FROM A PLURALITY OF PORTS, THE ONE OR MORE DATA FLOWS HAVING A COMMON DESTINATION PORT AT A SECOND LEAF NODE ─ 110

RESPONSIVE TO A COMBINED DATA RATE OF THE FIRST ONE MORE DATA FLOWS EXCEEDING A RATE LIMIT OF THE COMMON DESTINATION PORT AT A SECOND IHS, LIMIT EGRESS OF THE ONE OR MORE DATA FLOWS FROM THE LEAF NODE BASED ON THE RATE LIMIT OF THE COMMON DESTINATION PORT ─ 120

MEASURE, AT A SPINE NODE, DATA RATES OF ONE OR MORE DATA FLOWS RECEIVED AT ONE OR MORE PORTS AT ONE OR MORE LEAF NODES FROM A PLURALITY OF PORTS, THE ONE OR MORE DATA FLOWS HAVING A COMMON DESTINATION PORT ON A SECOND LEAF NODE ─ 130

RESPONSIVE TO A COMBINED DATA RATE OF THE ONE MORE DATA FLOWS EXCEEDING A RATE LIMIT OF THE COMMON DESTINATION PORT AT A SECOND IHS, LIMIT EGRESS OF THE ONE OR MORE DATA FLOWS FROM THE SPINE NODE BASED ON THE RATE LIMIT OF THE COMMON DESTINATION PORT ─ 140

FIGURE 1B

REDUCING INTERNAL FABRIC CONGESTION IN LEAF-SPINE SWITCH FABRIC

BACKGROUND

Field of Invention

The present invention relates generally to the field of data communications, and relates more particularly systems and methods of switching fabric data flow control in a network environment.

Description of the Related Art

When a large switching device is built using many smaller switching devices, a switch fabric may be a Clos architectural fabric organized in a leaf-spine topology. The switch fabric may include connections of the smaller switching devices configured as leaf nodes and spine nodes according to the leaf-spine topology. Input/Output (I/O) ports residing on the switching devices may receive data from other computing devices in a network. Upon receiving the data, the switch fabric may process the data in leaf nodes and spine nodes. And the I/O ports may then send the processed data to the network.

In a leaf-spine topology, it is possible for multiple ingress ports at a leaf node to send traffic to a common egress port on a destination leaf node. As a result, it is possible to have oversubscription at the common destination port. Oversubscription is a common occurrence in packet networks. The assumption is that different data flows generated by different users may require higher rate of utilization at different times, thus creating an opportunity to employ statistical multiplexing, improve the system utilization, and reduce the overall costs. However, this may result in temporary oversubscription of resources, and for this approach to succeed, it must not sacrifice the quality of service the end user expects, and therefore, must address issues such as congestion and proper handling of different priority traffic flows. Especially, in a Clos fabric organized in a leaf-spine topology, it is possible for traffic destined to one output port to consume more than its fair share of the fabric resources through the spine node, only to get discarded at the destination leaf node.

Accordingly, there is a need to minimize the potential for wastage of resources in a leaf-spine switch fabric, reduce the internal fabric congestion, and ensure that traffic destined for a given output port has a good chance of being transmitted out of the system before being allowed to consume resources in the switch fabric.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

FIGS. 1A and 1B are flowcharts illustrating static rate limiting according to embodiments of the present invention.

DETAILED DESCRIPTION OF THE PREFERRED EMBODIMENTS

Figure 2:
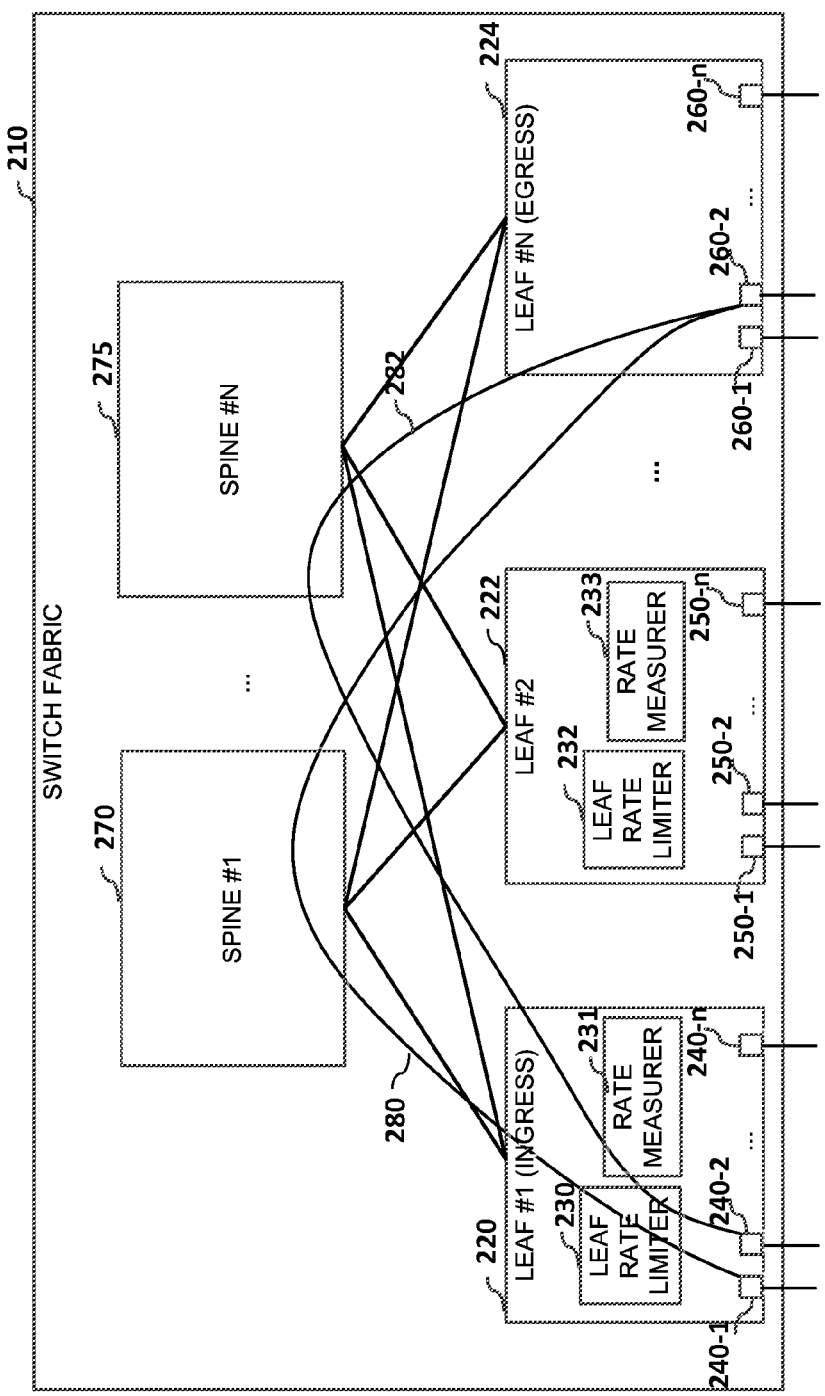
FIG. 2 depicts an example system performing a static rate limiting on a leaf node according to embodiments of the present invention.

In the following description, for purposes of explanation, specific examples and details are set forth in order to provide an understanding of the invention. It will be apparent, however, to one skilled in the art that the invention may be practiced without these details. Well-known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The terms "datagram," "packet," or "frame" shall be understood to mean a group of bits that can be transported across a network. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The term "stream" may refer to any sequence of packets transmitted via a network. The terms "data flow", "traffic flow", or "flow" may refer to a variety of streams of data. The terms "data flow", "traffic flow", or "flow" may also refer to packets transmitted (e.g., between two network interfaces) within a period of time.

FIG. 1A is a flowchart illustrating an example method 100A executed to perform static rate limiting by an information handling system (IHS) according to embodiments of the present invention. And FIG. 1B is a flowchart illustrating an example method 100B executed to perform static rate limiting by an information handling system (IHS) according to embodiments of the present invention. In embodiments, the IHS may be a leaf node or a spine node in a leaf-spine topology switch fabric. Accordingly, the IHS may comprise a data rate measurer and a rate limiter on a leaf node when the IHS is configured as a leaf node, or the IHS may comprise a data rate measurer and a rate limiter on a spine node when the IHS is configured as a spine node. Illustrated in FIGS. 1A and 1B are operations 110-140 that are executed by, for example, a data rate measurer on a leaf node, a rate limiter on the leaf node, a data rate measurer on a spine node, and a rate limiter on the spine node. In addition to the data rate measurer and the rate limiter, the IHS may include a plurality of ports for sending and receiving data to one or more devices and one or more processors that are communicatively coupled to the plurality of ports to facilitate the sending and receiving of data.

In embodiments, the IHS is a leaf node in a leaf-spine system. An operation 110 is executed by the leaf node data rate measurer residing on the leaf node to measure data rates of one or more data flows received at one or more ports from the plurality of ports, the one or more data flows having a common destination port. In embodiments, the common destination port is at a second leaf node in the leaf-spine system. And in embodiments, a rate limit of each port of a set of ports at the second leaf node is communicated to the IHS. Following the operation 110, an operation 120 is executed by the leaf rate limiter, responsive to a combined data rate of the one or more data flows exceeding a rate limit of the common destination port at the second leaf node, to limit egress of the one or more data flows from the IHS based on the rate limit of the common destination port. In embodiments, the rate limit may include a port speed of the common destination port with some adjustment factor, such as a burst size, to allow for bursting. In embodiments, the burst size may be related to at least a buffer size of the second leaf node, where the common destination port resides. For example, the burst size may be the average or maximum amount of buffering that is available for the one or more data flow at the second leaf node. By limiting the data at the leaf, data is not needlessly transmitted to the spine and to the destination leaf only to be discarded.

In embodiments, the IHS is a spine node in a leaf-spine system. The spine node data rate measurer residing on the spine node measures 130 data rates of one or more data flows received at one or more ports at the spine node. The one or more data flows have a common destination port and are routed to the common destination port via the spine node. In embodiments, the one or more ports are at one or more leaf nodes in a leaf-spine system, and the common destination port is at a second leaf node in the leaf-spine system. And in embodiments, a rate limit of each port of a set of ports at the second leaf node is communicated to the spine node. Following the operation 130, responsive to a combined data rate of the one or more data flows exceeding a rate limit of the common destination port at the destination leaf node, the spine rate limiter residing on the spine node limits 140 egress of the one or more data flows from the spine node based on the rate limit of the common destination port.

Figure 3:
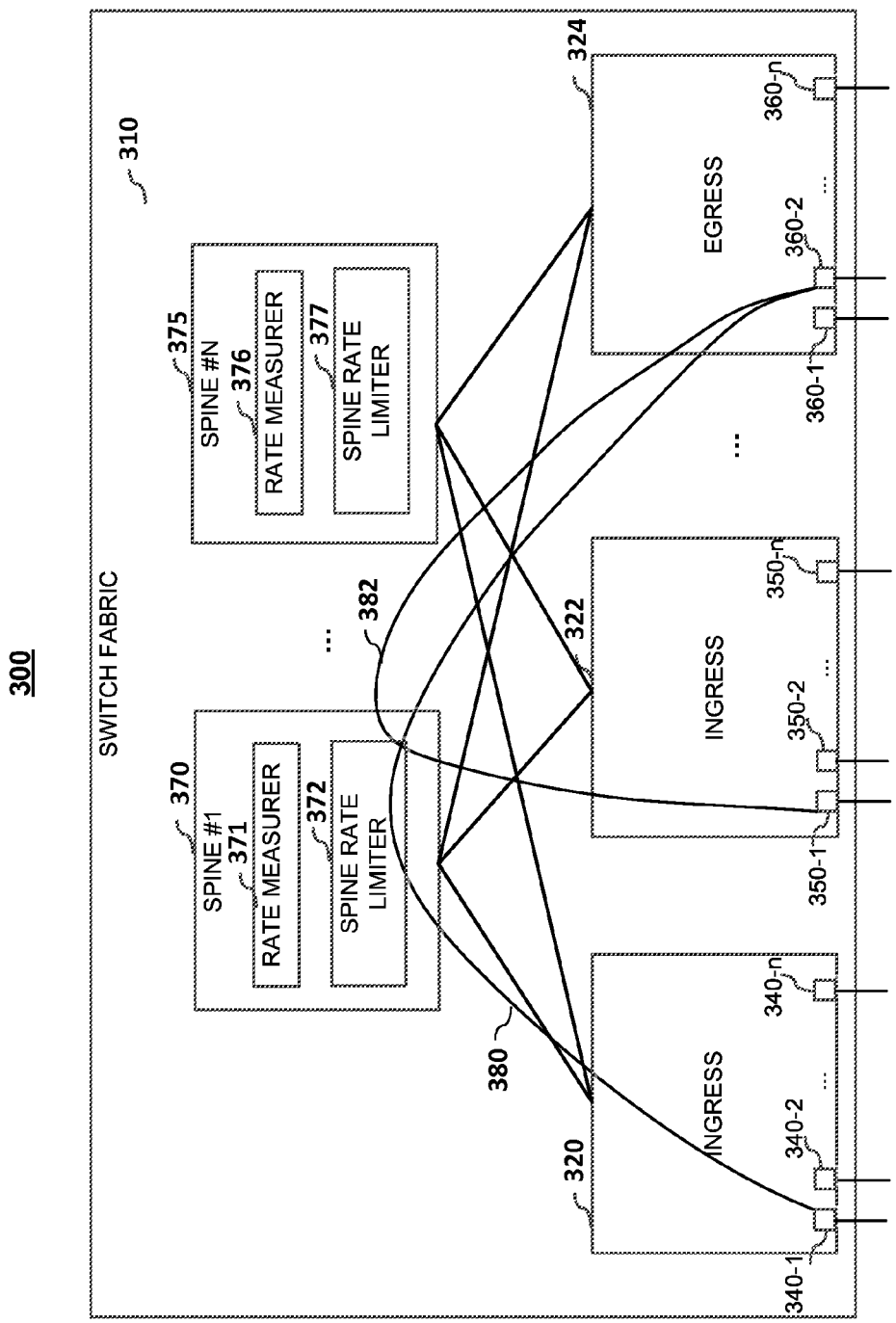
FIG. 3 depicts an example system performing a static rate limiting on a spine node according to embodiments of the present invention.

The static rate limiting methodology illustrated in FIGS. 1A and 1B may be implemented in exemplary systems as shown in FIG. 2 and FIG. 3. FIG. 2 illustrates a leaf node rate limiter located on a leaf node performing the operations 110-120 when the IHS is configured as the leaf node according to embodiments. And FIG. 3 illustrates a spine node rate limiter located on a spine node performing the operations 130-140 when the IHS is configured as the spine node according to embodiments.

FIG. 2 depicts an example leaf-spine system 200 performing the rate limiting operations 110-120 of FIG. 1A using leaf rate limiters, such as 230 and 232, according to embodiments of the present invention. Each switching devices may be an IHS having a plurality of ports and one or more processors communicatively coupled to the plurality of ports. The ports may be used for sending data to and receiving data from one or more devices in a network. And the one or more processors may facilitate the sending and receiving of data by the ports.

In the example system 200, a switch fabric 210 may include a plurality of connected switching devices such as spine node 1 270 . . . spine node N 275, leaf node 1 220, leaf node 2 222 . . . leaf node N 224. Each of the leaf nodes 220-224 as an IHS may include a plurality of ports 240-1, 240-2 . . . 240-n; 250-1, 250-2 . . . 250-n; and 260-1, 260-2 . . . 260-n (respectively) representing physical and/or logical interfaces for receiving data into and sending data out of the devices.

When a data flow is received into the switch fabric 210 via a port among the plurality of I/O ports 240-260, the switching device hosting the port may be denoted as an ingress/input/source node for the data flow, and the port may be denoted as an ingress/input/source port. Similarly, when data in a data flow is sent out of the switch fabric 210 via a port among the plurality of I/O ports 240-260, the switching device hosting the port may be denoted as an egress/output/destination node for the data flow, and the port may be denoted as an egress/output/destination port. It shall be noted that this same terminology may be used with reference to a node, in which data is received at an ingress port and exits the node via an egress port.

For example, in the leaf-spine topology inside the switch fabric 210, a switching device denoted as the leaf node 1 220 hosts a plurality of ports 240-1, 240-2 . . . 240-n. Among the plurality of ports 240-1, 240-2 . . . 240-n, ports 240-1 and 240-2 may be used for receiving data in data flows 280 and 282 respectively into the switch fabric 210. The leaf node 1 220 may be denoted as an ingress node for the data flows 280 and 282. Similarly, a switching device denoted as the leaf node N 224 may host a plurality of ports 260-1, 260-2 . . . 260-n. Among the plurality of ports 260-1, 260-2 . . . 260-n, a port 260-2 may be used for sending data flows 280 and 282 data out of the switch fabric 210 to one or more devices in a network. The leaf node N 224 may be denoted as an egress node for the data flows 280 and 282.

Though not shown in FIG. 2, communicatively coupled to the ports 240-260, the one or more processors of the leaf nodes 220-224 may facilitate the sending and receiving of data into and out of the leaf nodes 220-224. The functions performed by the one or more processors may include facilitating the routing of the data in the data flows 280 and 282 to the common destination port 260-2 via two different spine nodes 270 and 275 in the leaf-spine system 210, and communicating a rate limit of each port of a set of ports at a different IHS to the IHS according to embodiments.

As stated previously, a switch fabric in a leaf-spine topology allows oversubscription. When a port oversubscribes, the traffic may be discarded at the port according to embodiments. To minimize wasting of resources when traffic is destined to one output port only to get discarded at the destination, rate limiters such as 230 and 232 may limit the data flows on ingress nodes 220 and 222. Each leaf node may have a rate limiter installed for each egress port in the switch fabric 210. The egress ports may be located on remote leaf nodes. For example, the rate limiter 230 may, responsive to a combined data rate of the one or more data flows 280 and 282 exceeding a rate limit of the common destination port 260-2 at a second IHS 224, limit egress of the one or more data flows from the IHS 220 based on the rate limit of the common destination port 260-2.

In embodiments, the rate limit of the common destination port 260-2 is a port speed of the common destination port 260-2. For example, a port with a port speed 10 Gbits/s has a rate limit of 10 Gbit/s. In embodiments, the rate limit may also include a burst size. The port speed plus the burst size may limit the amount of data that may be sent and/or received at a given instance. In embodiments, the burst size may be related to at least a buffer size of the second IHS 224 wherein the common destination port 260-2 resides.

For example, in FIG. 2, the second IHS 224 may have a plurality of ports 260-1, 260-2 . . . 260-n. Among the plurality of ports 260-1, 260-2 . . . 260-n, the common destination port 260-2 for the data flows 280 and 282 may have a port speed 10 Gbit/s. The port speed may be communicated by the second IHS 224 to the IHS 220 as the rate limit of the port 260-2. Alternatively, the rate limit may also include a burst size, such as 2 Gbit/s, that is related to at least a buffer size of the second IHS 224. When the rate limit includes a burst size, the port speed 10 Gbit/s plus the burst size 2 Gbit/s may be communicated to the IHS 220 as the rate limit of the common destination port 260-2. In embodiments, when the rate limit includes a burst size, the rate limit may be configured as a combination of a peak rate (e.g. 20 Gbit/s), a burst size (e.g. 100 KB), and a port speed (e.g. 10 Gbits/s). In embodiments, the peak rate and the burst size together control how much bursting would be tolerated, and how often such bursts would be permitted.

In embodiments, to limit egress of the one or more data flows from the IHS 220 based on the rate limit of the common destination port 260-2, measurements may be taken before data flows 280 and 282 reach the common destination port 260-2, so that switch fabric 210 resources may not be wasted. For example, upon receiving data via the ingress ports 240-1 and 240-2, the data rate measurer on the IHS 220 may measure the data rates of data flows. In case the data rate of the data flow 280 received at the port 240-1 is 6 Gbit/s, the data rate of the data flow 282 received at the port 240-2 is 6 Gbit/s, the one or more processors of the IHS 220 may calculate a combined data rate of the data flows 280 and 282 as 12 Gbit/s. For example, consider the case in which the rate limit of the common destination port 260-2 on the second IHS 224 communicated to the IHS 220 is 10 Gbit/s, responsive to the combined data rate of 12 Gbit/s exceeding the rate limit 10 Gbit/s of the common destination port 260-2, the rate limiter 230 may limit egress of data flows 280 and 282 from the IHS 220 to 10 Gbit/s, based on the rate limit 10 Gbit/s of the common destination port 260-2. In embodiments, the communicated size of the destination port may include a burst or buffer size (or a portion thereof) as well. For example, if the rate limit of the common destination port 260-2 communicated to the IHS 220 was 12 Gbit/s (the port speed 10 Gbit/s plus a burst size of 2 Gbit/s), the rate limiter 230 would not limit egress of data flows 280 and 282 from the IHS 220 to the common destination port 260-2.

FIG. 3 depicts an example system 300 performing the rate limiting operations 130-140 of FIG. 1 with a rate limiter 372 located on a spine node 370, according to embodiments of the present invention. Similar to the example system 200, in the example system 300, a switch fabric 310 may include a plurality of connected switching devices, such as spine node 1 370 . . . spine node N 375, leaf node 1 320, leaf node 2 322 . . . leaf node N 324. Each node may include a plurality of ports representing physical and/or logical interfaces for receiving data into and sending data. And similar to the example illustrated in FIG. 2, two exemplary data flows 380 and 382 routed to a common destination port 360-2 are shown to illustrate the static rate limiting according to embodiments, with each data flow having a data rate of 6 Gbit/s and the common destination port 360-2 on a second IHS 324 having a port speed of 10 Gbit/s. In addition, similar to the exemplary system 200, the rate limit of the common destination port 360-2 may be 12 Gbit/s, the port speed 10 Gbit/s plus a burst size 2 Gbit/s.

Different from the example system 200 in FIG. 2, in FIG. 3, the IHS 370 is a spine node, such as the spine node 1 370. And instead of two ingress ports 240-1 and 240-2 on the same leaf node, in FIG. 3, two ingress ports 340-1 and 350-1 are located on two different leaf nodes 320 and 322. The leaf node 320 is denoted as the ingress node for the data flow 380, and the leaf node 322 is denoted as the ingress node for the data flow 382. In the depicted embodiment, the data flows 380 and 382 are routed to the common destination port 360-2 via the same spine node 370.

To minimize the wasting of resources when traffic destined to one output port to unnecessarily consume switch fabric resources only to get discarded at the destination, the rate limiter 372 residing on the spine node 1 370 may limit the data flows egressing from the spine node 1 370. The rate limiter 372 may, responsive to a combined data rate of the one or more data flows 380 and 382 exceeding a rate limit of the common destination port 360-2 at the second IHS 324, limit egress of the one or more data flows 380 and 382 from the IHS 370 based on the rate limit of the common destination port 260-2.

In embodiment, to perform the rate limiting according to embodiments, a data rate measurer on the spine node 1 370 may measure the combined data rates of data flows. The one or more processors of the IHS 370 may calculate a combined data rate of the data flows 380 and 382 as 12 Gbit/s (by way of example). Assuming that the rate limit communicated by the second IHS 324 to the IHS 370 is 10 Gbit/s, responsive to the combined data rate of 12 Gbit/s exceeding the rate limit 10 Gbit/s of the common destination port 360-2, the spine rate limiter 372 may limit egress of data flows 380 and 382 from the IHS 370 to 10 Gbit/s, based on the rate limit 10 Gbit/s of the common destination port 360-2. In embodiments, the communicated size of the destination port may include a burst or buffer size (or a portion thereof) as well. For example, if the rate limit communicated to the IHS 370 is 12 Gbit/s (the port speed 10 Gbit/s plus a burst size of 2 Gbit/s), the rate limiter 372 would not limit egress of data flows 380 and 382 from the IHS 370 to the common destination port 360-2.

By limiting the data flow on an ingress leaf node and/or a spine node, the data flow exceeding a rate limit of a destination port may be limited before reaching the destination port. Unnecessary internal fabric resource consumption may thus be reduced. For example, when a rate limiter is on a leaf node, and there are multiple ports on the same leaf node transmitting to a common destination port as illustrated in FIG. 2, responsive to a combined data rate of the data flows exceeding a rate limit of the common destination port, the traffic may be discarded at the ingress leaf node, saving resources on the link to the spine node and the resources in the spine node. Similarly, when a rate limiter is on a spine node, and there are multiple ports on different leaf nodes transmitting to the same common destination port via the same spine node, the spine rate limiter may detect the oversubscription and excess traffic may be discarded, saving resources on the down link of the spine node. Thus, the potential for wasting resources in a leaf-spine switch fabric may be reduced, the internal fabric congestion may be reduced, and traffic destined for a given output port has a better chance of being transmitted out of the system before being allowed to consume resources in the switch fabric.

In embodiments, the data rate limiter whether residing on a leaf node, such as the leaf rate limiter 230 or 232 in FIG. 2, or on a spine node, such as the spine rate limiter 372 or 377 in FIG. 3, may be implemented as a policer or a shaper. Both a policer and a shaper may be configured to receive a plurality of data packets for a data flow and generate a modified data flow. The modified data flow may transmit traffic at a relatively steady rate, even if data packets in the data flow arrive in a bursty fashion. The difference is that a policer may perform policing function to detect and penalize the violation of the peak traffic rate. When the traffic rate reaches the configured maximum rate, excess traffic may be discarded or tagged. In contrast, a shaper may perform shaping function to retain excess packets in a queue and then schedules the excess for later transmission over increments of time. The result of traffic shaping may be a smoothed packet output rate.

Also in embodiments, the rate limiting may be adapted to not only lossy traffic, but also lossless traffic. In the case of lossless traffic, priority-based flow control (PFC) may be invoked to keep the switch fabric lossless. PFC may select traffic flows and pause them, so that the output queues associated with the flows do not overflow and discard packets. Thus, instead of discarding the traffic during rate limiting, PFC may be issued on an input port when its demand exceeds the rate limit.

It shall be noted that the methods of FIG. 1A and FIG. 1B may be combined together in a leaf-spine system. One skilled in the art shall recognize that benefits have employ the static rate limiting systems and methods as illustrated in FIGS. 1-3 may be used to detect and limit the combined data rate from the same leaf node (as shown in FIG. 2) and/or from the same spine nodes (as shown in FIG. 3). To account for traffic from multiple leaf nodes traversing different spine nodes and the combined data rate exceeding the rate limit of a common destination port, dynamic rate limiting systems and methods as illustrated in FIGS. 4-7 may be used. In the dynamic solution, the demands for the ports on all of the leaf nodes (or a subset thereof) may be measured. The measurement may be received by a global scheduler and allocations may be calculated. And distributed dynamic rate limiters may be installed on the leaf nodes. The dynamic rate limiter may then limit the traffic based on the global scheduler rate allocation calculation. In addition to the benefit of rate limiting to reduce unnecessary fabric resource consumption, the dynamic rate limiting solution may provide more fairness than the static solution's first-come-first-serve (FCFS) by having a global view of the demands in a switch fabric and allocating across ingress ports and/or nodes in a switch fabric.

Figure 4:
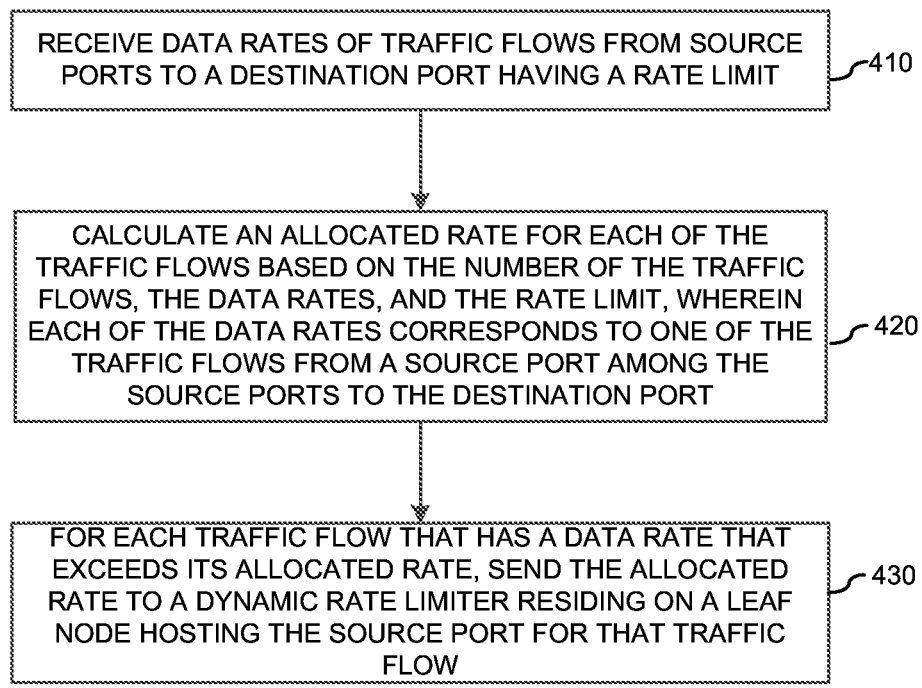
FIG. 4 is a flowchart illustrating a dynamic rate limiting method according to embodiments of the present invention.

FIG. 4 is a flowchart illustrating an example method 400 executed to perform dynamic rate limiting according to embodiments of the present invention. Illustrated are operations 410-430 that are executed by, for example, a global scheduler in a switch fabric. In embodiments, the global scheduler may include a rate monitor, a rate allocator, and a rate limit notifier. In embodiments, the rate monitor receives 410 data rates of traffic flows from source ports. In embodiments, the rate limit of the destination port may be a port speed of the port. In alternative embodiments, in addition to the port speed, the rate limit may include the port speed plus a burst size, which may be related to a buffer size of the destination node hosting the destination port.

After obtaining the measurement, the rate allocator calculates 420 an allocated rate for each of the traffic flows based on the number of the traffic flows, the data rates, and the rate limit, wherein each of the data rates corresponds to one of the traffic flows from a source port to the destination port. In embodiments, at least for each traffic flow that has a data rate that exceeds its allocated rate, the rate limit notifier sends 430 the allocated rate to a dynamic rate limiter residing on a leaf node hosting the source port for that traffic flow. Similar to the rate limiters used in the static solution, in embodiments, the dynamic rate limiter may be a policer or a shaper. And similar to the rate limiting used in the static solution, in embodiments, the dynamic rate limiting may be adapted to not only lossy traffic, but also lossless traffic. In the case of lossless traffic, priority-based flow control (PFC) may be invoked to keep the switch fabric lossless. Embodiments of interactions of the global scheduler and other switching devices of the switch fabric performing dynamic rate limiting are further illustrated in FIGS. 5-6 and 7A-7B.

Figure 5:
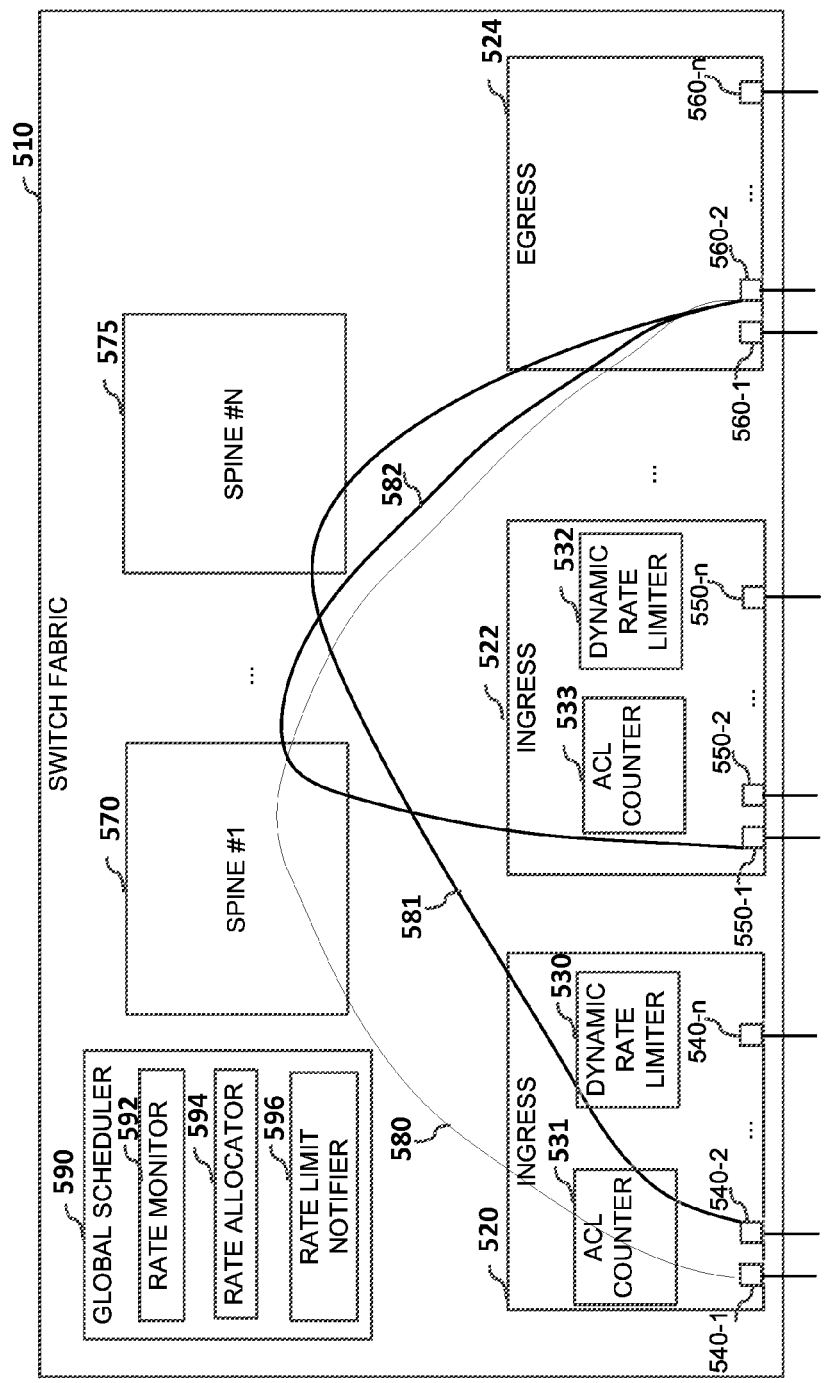
FIG. 5 depicts an example system performing a dynamic rate limiting according to embodiments of the present invention.

FIG. 5 depicts an example system 500 performing a dynamic rate limiting using a global scheduler 590, according to embodiments of the present invention. In embodiments, the global scheduler 590 may reside on one or more of the spine nodes, one or more leaf nodes, a separate management system that is inside and/or outside the switch fabric 510. Similar to the example systems 200 and 300, in the example system 500, a switch fabric 510 may include a plurality of connected switching devices such as spine node 1 570 . . . spine node N 575, leaf node 1 520, leaf node 2 522 . . . leaf node N 524. To avoid cluttering the depicted example, not all of the interconnections are shown. Each of the nodes 520-575 may include a plurality of ports (e.g., ports 540-1, 540-2 . . . 540-$n$, 550-1, 550-2 . . . 550-$n$, 560-1, 560-2 . . . 560-$n$) representing physical and/or logical interfaces for receiving data into and sending data out of the leaf nodes. Three exemplary data flows 580-582 routed to a common destination port 560-2 are shown to illustrate the dynamic rate limiting according to embodiments. Similar to the exemplary systems 200 and 300, the common destination port 560-2 may have a port speed of 10 Gbit/s. And similar to the exemplary systems 200 and 300, the rate limit of the common destination port 560-2 may be 12 Gbit/s (the port speed 10 Gbit/s plus a burst size 2 Gbit/s).

Different from the example systems 200 and 300, according to embodiments of dynamic rate limiting, the traffic for each egress port in the switch fabric 510 is measured at each ingress leaf node in the switch fabric 510, and the measured rate is gathered by the global scheduler 590. The global scheduler 590 may include a rate monitor 592, a rate allocator 594, and a rate limit notifier 596. The rate monitor 592 may receive data rates of traffic flows 580-582 from source ports 540-1, 540-2, and 550-1 to a common destination port 560-2. In embodiments, the rate allocator 594 calculates an allocated rate for each of the traffic flows 580-582 based on the number of the traffic flows, the data rates, and the rate limit, wherein each of the data rates corresponds to one of the traffic flows 580-582 from a source port among the source ports 540-1, 540-2, and 550-1 to the destination port 560-2. After the calculation, in embodiments, for at least each traffic flow that has a data rate that exceeds its allocated rate, a rate limit notifier 596 sends the allocated rate to a dynamic rate limiter residing on a leaf node hosting the source port for that traffic flow.

For example, consider a case the global scheduler 590 determines the data flows 580 and/or 581 have exceeded their allocated rates, the rate limit notifier 596 sends the allocated rate to the dynamic rate limiter 530 on the leaf node 520 hosting the source ports 540-1 and/or 540-2 for the traffic flows. Similarly, in another example, consider a case the global scheduler 590 determines the data flow 582 has exceeded its allocated rate, the rate limit notifier 596 sends the allocated rate to the dynamic rate limiter 532 on the leaf node 522 hosting the source ports 540-1 and/or 540-2 for the traffic flows.

In embodiments, to save system resources, instead of allocating rates for all destination ports, the global scheduler 590 is configured to evaluate the destination port 560-2 to identify whether the destination port 560-2 is an oversubscribed destination port. The allocation may then be performed to allocate among a set of traffic flows to the oversubscribed destination port.

In embodiments, the data rate measurement may be obtained from access control list (ACL) counters, such as ACL counters 531 and 533 on ingress leaf nodes 520 and 522. An ACL unit on a switching device may control which packets of a packet flow are allowed to enter from and/or exit to a network via an interface of the switching device. Each packet received and/or transmitted by an interface on a switching device may be examined against rules specified in an access list associated with the ACL unit. In embodiments, an ACL unit may have at least one counter. One or more processors of the switching device may read and reset the ACL counter. After reset, when an ACL unit starts accepting packet for a data flow, the ACL counter may count the packets and/or bytes that are allowed to pass to the switch fabric 510, so that the reading from the ACL counter is indicative of the traffic flows between active source ports on at least one leaf node and the destination node in the switch fabric 510.

For example, one or more processors on leaf nodes 520 and 522 may communicate with the global scheduler 590 readings of the ACL counters 531 and 533 on the leaf nodes 520 and 522, so that the global scheduler 590 may gather data rates of traffic flows 580-582 from source ports 540-1, 540-2, and 540-3 on ingress nodes 520 and 522 to a common destination port 560-2. In embodiments, to conserve system resources, the data rates gathering may be adapted to work at a coarser level of granularity, so that each of the active source ports includes at least one of an active source port on a leaf node.

In embodiments, gathering the ACL counters per ingress port, per egress port as described above may be at the finest level of granularity. At the finest level of granularity, the data rate monitor may be configured to gather from the ACL counters for each of the active source ports and assign the measurement as the data rates for rate allocation calculation. In embodiments, instead of managing flows and gathering the ACL counters readings at a per-port level, the data flows may be managed per group of ports or even per destination leaf. When the data rate monitor is configured to gather from the ACL counters for a group of the active source ports or the ACL counters for each of the leaf nodes hosting the active source ports, the measurement for each group or for each leaf node may be assigned as the data rates for rate allocation calculation.

Following the rate measurement by the ACL counters and receiving the data rates by the rate monitor 592, in embodiments, the rate allocator 594 may use one or more algorithms known in the art, such as max-min fairness scheme, among others, to calculate an allocated rate for each of the traffic flows. Consider, by way of illustration and not limitation the following example using a max-min fairness methodology.

The max-min scheme is based upon an iterative procedure of computing the data rate allocation among data flows. Every data flow gets as much as it needs, as long as it does not exceed its fair share. Leftover bandwidth may be reassigned to the other data flows. Using the max-min fairness scheme, prior to a first iteration of the procedure, a set of variables $R=\{r_1, r_2, \ldots, r_n\}$ defines the data rates received by the rate monitor 592. In embodiments, items in the set of variables may represent the traffic received for a common destination port from ingress ports 1, 2 . . . n. The common destination port may have a port speed of S. Another set of variables $A=\{a_1, a_2, \ldots, a_n\}$ may define the set of rates allocated by the global scheduler 590. The set of variables A may be initialized to all zeros. The following algorithm may be used as an implementation of the max-min fairness iterations to compute the allocated rates, A.

```
Repeat while n > 0 && S > 0
    x = S/n
    For each r_i in R
        If r_i <= x
            a_i = r_i
            R = R - {r_i} /* r_i has received its maximum
            allocation, so remove it from further allocation */
            A = A - {a_i}
            S = S - a_i
            n = n - 1
        If r_i > x
            a_i = a_i + x
            r_i = r_i - x
            S = S - x
```

Using the above algorithm, the dynamic rate allocation may include the steps of first dividing the rate limit by the number of the traffic flows to obtain an average. Second, for a data rate in the data rates, the data rate corresponding to a traffic flow, responsive to the data rate not exceeding the average, setting an allocated rate corresponding to the traffic flow to the data rate, removing the data rate from the data rates, removing the allocated rate from the set of allocated rates, subtracting the allocated rate from the rate limit, and reducing the number of the traffic flows by one. Third, responsive to the data rate exceeding the average, adding the average to the allocated rate corresponding to the traffic flow, subtracting the average from the data rate, and subtracting the average from the ate limit. Then the above three steps may be repeated while the number of the traffic flows and the rate limit are positive.

For example, in case data flows 580, 581, and 582 have data flow rates of 2 Gbit/s, 6 Gbit/s, and 8 Gbit/s respectively, and the given destination port 560-2 has a port speed S of 10 Gbit/s, a set of variable R={$r_1$=2, $r_2$=6, $r_3$=8} defines the data rates identified by the rate identification module. $r_1$ is initialized to 2 representing the data rate of the data flow 580 received at the ingress port 540-1 intended to the egress port 560-2. $r_2$ is initialized to 6 representing the data rate of the data flow 581 received at the ingress port 540-2 intended to the common egress port 560-2. And $r_3$ is initialized to 8 representing the data rate of the data flow 582 received at the ingress port 550-1 intended to the common egress port 560-2. The set of allocation variables is initialized to zeroes, A={$a_1$=0, $a_2$=0, $a_3$=0}.

In a first iteration, the resource S=10 Gbit/s may be tentatively divided into three portions of size about 3.33 Gbit/s. Since 3.33 is larger than flow 1's demand ($r_1$=2), flow 1's allocation is set to 2 Gbit/s ($a_1$=2). This leaves about 1.33 Gbit/s leftover resource for the remaining two flows, which may be divided evenly among the rest in a second iteration, giving about 0.66 Gbit/s each of the excess. After the first iteration, the allocation to the data flow 580 is $a_1$=2 Gbit/s. The set of variables for next round of iteration are R={$r_2$=2.66, $r_3$=4.66} and A={$a_2$=3.33, $a_3$=3.33}. After the second iteration, the fair allocation may be reached, so that the data flow 580 is allocated $a_1$=2 Gbit/s, the data flow 581 is allocated $a_2$=4 Gbit/s, and the data flow 582 is allocated $a_3$=4 Gbit/s.

Figure 6:
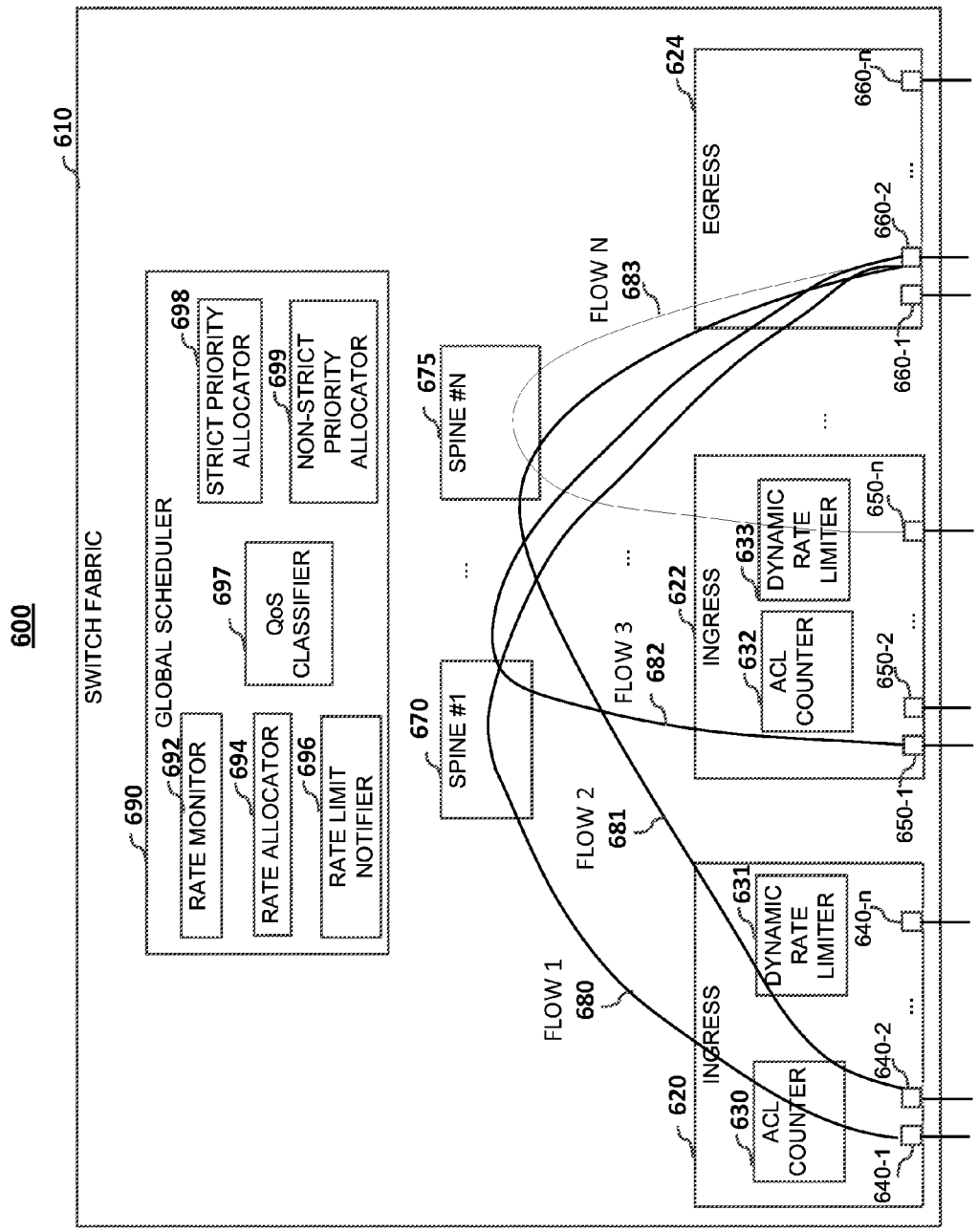
FIG. 6 depicts an example system performing a dynamic rate limiting with quality-of-service (QoS) support according to embodiments of the present invention.
Figure 7A:
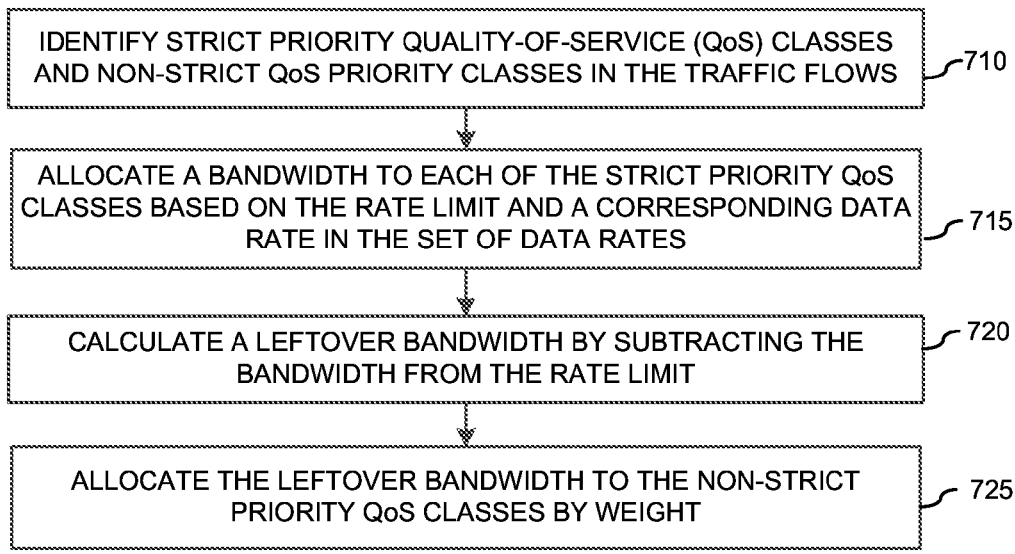
FIG. 7A is a flowchart illustrating a QoS rate allocation in a dynamic rate limiting method according to embodiments of the present invention.
Figure 7B:
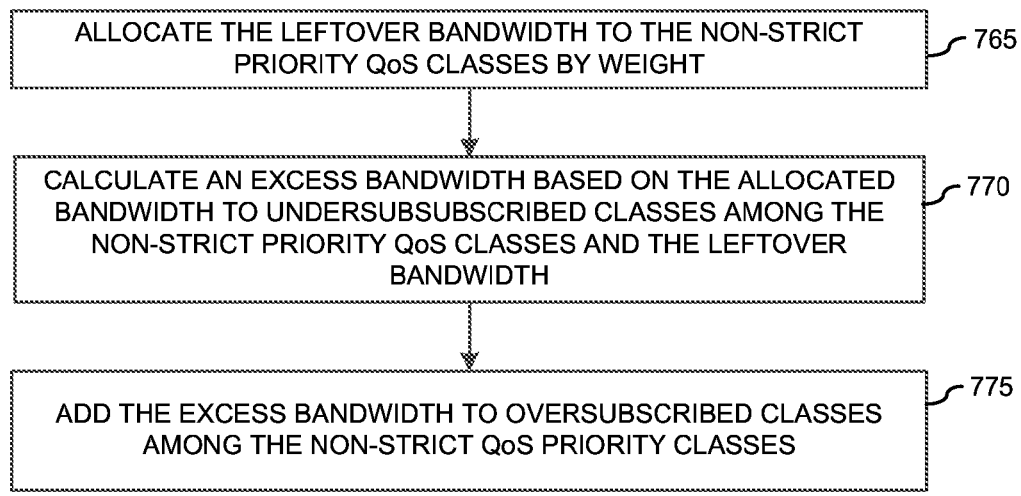
FIG. 7B is a flowchart illustrating a non-strict priority class QoS rate allocation in a dynamic rate limiting method according to embodiments of the present invention.

In the dynamic solution as illustrated in FIG. 5, using rate allocate algorithms such as max-min fairness, more fairness than FCFS may be provided. Leftovers from data flows that do not utilize their fair shares of the resources may be allocated to other data flows with high demands. In embodiments, the global scheduler 590 may periodically evaluate the traffic flows to recalculate the set of allocated rates, and send the recalculated set of allocated rate to dynamic rate limiters. By continuously monitoring demands from data flows within the switch fabric 510 and allocating fair share of rate to each data flow, the dynamic solution may reduce the possibility that traffic destined to the common egress port consumes more than its fair share of the fabric resources only to get discarded at the destination leaf node. Thus, the potential for wastage of resources may be reduced. In embodiments, the max-min fairness schema may be enhanced to support QoS. FIG. 6 and FIGS. 7A-7B illustrates the support of QoS according to embodiments of the present invention.

FIG. 6 depicts an example dynamic rate limiting system 600 with QoS support, according to embodiments of the present invention. Similar to the example system 500, in the example system 600, a switch fabric 610 may include a plurality of connected switching devices such as spine node 1 670 . . . spine node N 675, leaf node 1 620, leaf node 2 622 . . . leaf node N 624. Each of the nodes may include a plurality of ports representing physical and/or logical interfaces for receiving data into and sending data out of the leaf nodes. And similar to the example illustrated in FIG. 5, multiple exemplary data flows denoted as flow 1 . . . flow N 680-683 are routed to a common destination port 660-2.

Different from the example system 500, the example system 600 may provide QoS support. In embodiments, a global scheduler 690 may include a rate monitor 692, a rate allocator 694, a rate limit notifier 696, a QoS classifier 697, a strict priority allocator 698, and a non-strict priority allocator 699. As used herein, the term QoS generally refers to the ability to provide different priority to different applications, users, or data flows, or to guarantee a certain level of performance to a data flow. Incoming traffic flows may be distinguished into classes and weights are assigned to the classes. The classes may then be prioritized based on the weights indicating QoS priorities and/or other suitable indication of importance or delivery constraints. In embodiments, high priority QoS classes may be considered strict priority classes and receive preference in resource allocation over non-strict priority classes. In embodiments, the QoS classifier 697 may identify strict priority QoS classes and non-strict priority QoS classes in each data flow. Having determined flows belong to strict priority QoS classes, the strict priority allocator 698 may allocate among the strict priority QoS classes. And having determined flows belong to non-strict priority QoS classes, the non-strict priority allocator 698 may allocate among the non-strict priority QoS classes.

Each QoS class may have attributes, such as a QoS class identifier and an indicator indicating whether the QoS class is a strict or non-strict priority class, among others. Based on the QoS class attributes, rates may be allocated to flows within the classes. In embodiments, the rate allocation supporting QoS may be implemented using an adapted max-min fairness algorithm. Instead of allocating rates based on ingress and egress ports as shown in FIG. 5, traffic demand and rate allocation may take the weight assigned to each QoS class into consideration and allocate based on {port, QoS} according to embodiments of the present invention.

For example, similar to the example in FIG. 5, a common destination port 660-2 has a port speed S of 10 Gbit/s, demands from data flows, flow 1 . . . flow N 680-683 may be gathered based on measurements by the ACL counters 630 and 632 on ingress nodes 620 and 622 and recorded as data rates of the data flows. In addition to the measuring demands, the QoS classifier 697 may identify strict priority QoS classes and non-strict priority classes in the traffic flows, flow 1 . . . flow N 680-683. Other attributes such as weights assigned to different QoS classes may be gathered by the global scheduler 690 and included in the information for rate allocation calculation. In an exemplary system including twelve flows for rate allocation supporting QoS, the information for rate allocation calculation may be as follows.

| Flow | QoS Class | Demand | Strict or WRR | Weight |
|---|---|---|---|---|
| Flow 1 | 1 | 0.2 Gbit/s | Strict | N/A |
| Flow 2 | 1 | 0.5 Gbit/s | Strict | |
| Flow 3 | 1 | 0.3 Gbit/s | Strict | |
| Flow 4 | 2 | 1 Gbit/s | Strict | N/A |
| Flow 5 | 2 | 0.2 Gbit/s | Strict | |
| Flow 6 | 2 | 0.3 Gbit/s | Strict | |
| Flow 7 | 3 | 2 Gbit/s | Non-Strict | 20% |
| Flow 8 | 3 | 3 Gbit/s | Non-Strict | |
| Flow 9 | 3 | 1 Gbit/s | Non-Strict | |
| Flow 10 | 4 | 2 Gbit/s | Non-Strict | 80% |
| Flow 11 | 4 | 2 Gbit/s | Non-Strict | |
| Flow 12 | 4 | 1 Gbit/s | Non-Strict | |

In the above example, each of the flows may originate at any port of a leaf node in a switch fabric and egress on a common destination port. In embodiments, the scheduling order of the flows may start with strict priority classes, such as QoS class 1, QoS class 2, followed by non-strict priority classes, such as QoS class 3 (assigned weight 20%), QoS class 4 (assigned weight 80%). In embodiments, the scheduling order may use an algorithm such as Deficit Weighted Round Robin (DWRR). The strict-priority allocator 698 may allocate data rate to each strict priority QoS class proportional to the demands. Having allocated the bandwidth to strict priority QoS classes, the non-strict priority allocator 699 may carve the leftover bandwidth by weight for the non-strict priority classes. During non-strict priority QoS class rate allocation, undersubscribed classes may be first identified based on demands. The excess rate allocation to the undersubscribed classes may then be added to the remaining non-strict priority class rate allocation in proportion to weight. The allocation matrix may be solved based on the rate allocated to the non-strict priority class as if that were the rate limit for that class.

Continuing the above example of twelve flows, the strict priority allocator 698 may first allocate bandwidth to each of the strict priority QoS classes based on the rate limit and a corresponding data rate in the data rates. QoS class 1 has three flows, flow 1-3, and the total demands are 0.2+0.5+0.3=1 Gbit/s. Since 1 Gbit/s is less than the common destination port speed S of 10 Gbit/s, flows 1-3 in the strict priority QoS class 1 may be allocated 0.2 Gbit/s, 0.5 Gbit/s, and 0.3 Gbit/s respectively.

Similar to the allocation to strict priority QoS class 1, the strict priority allocator 698 may allocate 1 Gbit/s, 0.2 Gbit/s, and 0.3 Gbit/s to flows 4-5 in the strict priority Qos class 2 respectively, since the total demands of these flows are 1+0.2+0.3=1.5 Gbit/s, less than the bandwidth of 9 Gbit/s after class 1 allocation. The leftover bandwidth may be calculated by subtracting the bandwidth allocated to the strict priority QoS classes from the rate limit of the common destination port, 10−1−1.5=7.5 Gbit/s. Leftover bandwidth may then be allocated to non-strict priority QoS classes by weight.

When demands from one or more strict priority QoS classes equal to or exceed the rate limit of the common destination port, flows in non-strict priority QoS classes may not be allocated to any leftover bandwidth. In some cases, after allocating to some strict priority QoS classes according to a scheduling order, other strict priority QoS classes behind may be left with bandwidth less than the demands. In embodiments, a maximum bandwidth limit may be configured to limit the bandwidth allocation to strict priority QoS classes. Instead of allocating all or most of the bandwidth to one or more strict priority QoS classes according to scheduling orders, each strict priority QoS class may be associated with a maximum bandwidth limit. When the maximum bandwidth limit is less than the demands of flows in a strict priority QoS class, fairness algorithms, such as max-min fairness algorithm may be applied to allocate rates to the flows within that class.

In the twelve flow example above, a maximum bandwidth limit for strict priority QoS class 1 may be set to 2 Gbit/s and a maximum bandwidth limit for strict priority QoS class 2 may also be set to 2 Gbit/s according to embodiments. For class 1, since the maximum bandwidth limit is less than the demands of flows from the class, fairness algorithms such as max-min fairness algorithm may be applied to allocate rates to flows 1-3 within class 1. Similarly, for class 2, since the maximum bandwidth limit is less than the demands of flows from the class, fairness algorithms such as max-min fairness algorithm may be applied to allocate rates to flows 4-5. And the leftover bandwidth of 6 Gbit/s may then be allocated to non-strict priority QoS classes.

Once the strict priority allocator 698 completes the allocation for strict priority QoS classes, the non-strict priority allocation 699 may allocate the leftover bandwidth to the non-strict priority QoS classes by weight. Continuing the above example, since class 3 weight is 20%, class 3 may be allocated 0.2*7.5=1.5 Gbit/s, and since class 4 weight is 80%, class 4 may be allocated 0.8*7.5=6 Gbit/s. For class 3, the total demand is 2+3+1=6 Gbit/s, greater than the allocated 1.5 Gbit/s, class 3 may be identified as oversubscribed. For class 4, the total demand is 2+2+1=5 Gbit/s, class 4 may be identified as undersubscribed. Since class 4 is undersubscribed, flows 10-12 in class 4 may first be allocated data rates according to demands. The allocation to class 4 may allow the extra 1 Gbit/s to be allocated to the oversubscribed class 3. In case there are more than one oversubscribed non-strict priority QoS classes, the extra bandwidth may be allocated to the oversubscribed classes according to their weight.

Since class 3 demand is 6 Gbit/s and the available capacity is 2.5 Gbit/s, fairness algorithms, such as max-min fairness algorithm may be applied to determine the allocated rate among flows 7-9. Applying the exemplary implementation of max-min fairness algorithm above with resource S=2.5 Gbit/s and demands R={$r_1$=2, $r_2$=3, $r_3$=1}, in a first iteration, the resource S may be tentatively divided into three portions of size about S/3=2.5/3=0.833 Gbit/s. Since 0.833 is less than flows 10-12 demands, the fair allocation may be reached, so that each of the flows 10-12 may be allocated 0.833 Gbit/s respectively.

FIG. 7A is a flowchart illustrating an example method 700 executed to perform QoS rate allocation in a dynamic rate limiting method according to embodiments of the present invention. Illustrated are operations 710-725 that are executed by, for example, the global scheduler 690 for QoS classes in each data flow. In embodiments, the global scheduler 690 may include the QoS classifier 697, the strict priority allocator 698, and the non-strict priority allocator 699. In embodiments, the QoS classifier 697 identifies 710 strict priority QoS classes and non-strict priority QoS classes in the traffic flows. Among the strict priority QoS classes identified, the strict priority allocator 698 allocates 715 a bandwidth to each of the strict priority QoS classes based on the rate limit and a corresponding data rate in the data rates. The global scheduler 690 may then calculate 720 a leftover bandwidth by subtracting the bandwidth from the rate limit Following the leftover bandwidth calculation, in embodiments, the non-strict priority allocator 699 allocates 725 the leftover bandwidth to the non-strict priority QoS classes by weight.

FIG. 7B is a flowchart illustrating an example method 750 executed to perform non-strict priority class QoS rate allocation in a dynamic rate limiting method according to embodiments of the present invention. Illustrated are operations 765-775 that are executed by, for example, the non-strict priority allocator 699. An operation 765 is executed to allocate the leftover bandwidth to the non-strict priority QoS classes by weight. An operation 770 is executed to calculate an excess bandwidth based on the allocated bandwidth to undersubscribed classes among the non-strict priority QoS classes and the leftover bandwidth. And an operation 775 is executed to allocate the excess bandwidth to the oversubscribed classes among the non-strict priority QoS classes.

The embodiments of dynamic solutions as illustrated in FIGS. 4-7 are based on measurements of traffic demands across leaf nodes in a leaf-spine topology. Though traffic patterns may fluctuate, in most data centers, traffic patterns tend to follow long-term patterns that can benefit from the dynamic solution. In embodiments, one or more of the static solution as illustrated in FIGS. 1-3 may be provided in conjunction with one or more of the dynamic solution as illustrated in FIGS. 4-7. For example, when a new leaf node becomes active, the static solution may perform the rate limiting. The dynamic solution may be activated until sufficient measurements of demands are taken from the new leaf node and the existing active leaf nodes may be reassigned a lower bandwidth to provide fairness across. In embodiments, the static solution and the dynamic solution may be used simultaneously, so that the dynamic solution may work at a finer granularity and across multiple leaf nodes.

It shall be noted that aspects of the present patent document are directed to information handling systems. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, router, switch, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 8:
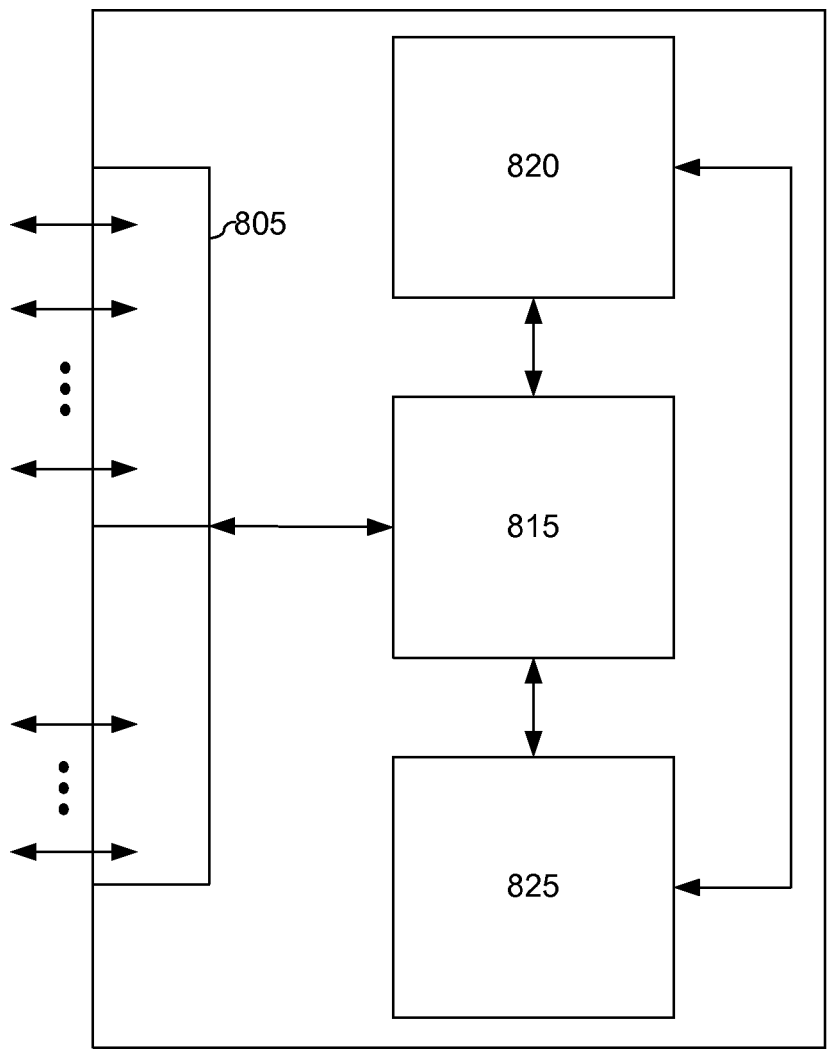
FIG. 8 depicts a block diagram of an exemplary information handling system node according to embodiments of the present invention.

FIG. 8 depicts a block diagram of an exemplary information handling system node according to embodiments of the present invention. It will be understood that the functionalities shown for switch 800 may operate to support various embodiments of the present invention—although it shall be understood that a node may be differently configured and include different components. The switch 800 may provide for buffering, packet processing, and forwarding of data packets being received by the switch 800. The node 800 may include a plurality of I/O ports 805, a data processing and fabric component 815, tables 820, and a switch control functionality portion 825. In embodiments, the I/O ports 805 are connected to one or more nodes. The I/O ports 805 are representative of physical and/or logical interfaces for receiving and sending data into and out from the switch 800, according to embodiments. The data processing functionality 815 may use information included in the network data received at the node 800, as well as information stored in the tables 820, to identify a data flow rate for the network data, among other possible activities. In embodiments, the switching fabric then schedules the network data for propagation through the node to an egress port for transmission.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. An information handling system (IHS) comprising:
a plurality of ports for sending data to and receiving data t-o from one or more devices; one or more processors that are communicatively coupled to the plurality of ports to facilitate the sending and receiving of data; and
a data rate measurer, executed by one or more processors, that measures data rates of one or more data flows received at one or more ports from the plurality of ports, the one or more data flows having a common destination port in a leaf-spine system; and
a rate limiter, executed by one or more processors, that responsive to a combined data rate of the one or more data flows exceeding a rate limit of the common destination port at a second IHS in the leaf-spine system, limits egress of the one or more data flows from the IHS based on the rate limit of the common destination port.

2. The information handling system (IHS) of claim 1, wherein the IHS is a leaf node in the leaf-spine system and wherein the common destination port is at a second leaf node in the leaf-spine system.

3. The information handling system (IHS) of claim 2, wherein a rate limit of each port of a set of ports at the second leaf node are communicated to the IHS.

4. The information handling system (IHS) of claim 1, wherein the IHS is a spine node in the leaf-spine system, the one or more ports are at one or more leaf nodes in the leaf-spine system, and the second IHS is a second leaf node in the leaf-spine system.

5. The information handling system (IHS) of claim 4, wherein at least two data flows from the one or more data flows ingressing to the IHS from different leaf nodes in the leaf-spine system routed to the common destination port via the spine node.

6. The information handling system (IHS) of claim 1, wherein a rate limit of each port of a set of ports at the second IHS is communicated to the IHS.

7. The information handling system (IHS) of claim 1, wherein the rate limit of the common destination port comprises a port speed of the common destination port.

8. The information handling system (IHS) of claim 7, wherein the rate limit of the common destination port further comprises the port speed plus a burst size.

9. The information handling system (IHS) of claim 8, wherein the burst size is related to at least a buffer size of the second IHS.

10. A method of dynamic rate limiting, the method comprising: receiving data rates of traffic flows from source ports to a common destination port having a rate limit;
    calculating an allocated rate for each of the traffic flows based on the number of the traffic flows, the data rates, and the rate limit, wherein each of the data rates corresponds to one of the traffic flows from a source port among the source ports to the common destination port; and
    for each traffic flow that has a data rate that exceeds its allocated rate, sending the allocated rate to a dynamic rate limiter residing on a leaf node in a leaf-spine system hosting the source port for that traffic flow.

11. The method of claim 10, wherein the calculating uses a max-min fairness algorithm.

12. The method of claim 11, wherein the max-min fairness algorithm includes the steps of:
    (a) dividing the rate limit by the number of the traffic flows to obtain an average;
    (b) for a data rate in the data rates, the data rate corresponding to a traffic flow,
    responsive to the data rate not exceeding the average, setting an allocated rate corresponding to the traffic flow to the data rate, removing the data rate from the data rates, removing the allocated rate from the set of allocated rates, subtracting the allocated rate from the rate limit, and reducing the number of the traffic flows by one;
    responsive to the data rate exceeding the average, adding the average to the allocated rate corresponding to the traffic flow, subtracting the average from the data rate, and subtracting the average from the rate limit; and
    (c) repeating steps (a) to (b) while the number of the traffic flows and the rate limit are positive.

13. The method of claim 10, wherein the calculating includes:
    identifying strict priority quality-of-service (QoS) classes and non-strict priority QoS classes in the traffic flows;
    allocating a bandwidth to each of the strict priority QoS classes based on the rate limit and a corresponding data rate in the data rates;
    calculating a leftover bandwidth by subtracting the bandwidth from the rate limit; and
    allocating the leftover bandwidth to the non-strict priority QoS classes by weight.

14. The method of claim 13, wherein allocating the leftover bandwidth includes:
    allocating the leftover bandwidth to the non-strict priority QoS classes by weight;
    calculating an excess bandwidth based on the allocated bandwidth to undersubscribed classes among the non-strict priority QoS classes and the leftover bandwidth; and
    allocating the excess bandwidth to oversubscribed classes among the non-strict priority QoS classes.

15. A global scheduler system for rate limiting data flows, the global scheduler system comprising:
    a rate monitor, executed by one or more processors, that receives data rates of traffic flows from source ports to a common destination port having a rate limit;
    a rate allocator, executed by one or more processors, to calculate an allocated rate for each of the traffic flows based on the number of the traffic flows, the data rates, and the rate limit, wherein each of the data rates corresponds to one of the traffic flows from a source port among the source ports to the common destination port; and
    a rate limit notifier, executed by one or more processors, that for each traffic flow that has a data rate that exceeds its allocated rate, sends the allocated rate to a dynamic rate limiter residing on a leaf node in a leaf-spine system hosting the source port for that traffic flow.

16. The system of claim 15, further comprising:
    a leaf rate limiter, residing on each of leaf nodes hosting the source ports, being responsive to a data rate exceeding the rate limit of the common destination port, configured to limit the traffic flows to the common destination port based on the rate limit of the common destination port.

17. The system of claim 15, further comprising:
    a spine node, configured to measure a data rate of at least one traffic flow among the traffic flows switched through the spine node to the common destination port; and
    a spine rate limiter residing on the spine node, being responsive to the data rate exceeding the rate limit of the common destination port, configured to limit the at least one traffic flow to the common destination port based on the rate limit of the common destination port.

18. The system of claim 15, wherein the global scheduler is configured to evaluate the common destination port to identify an oversubscribed destination port, and allocate among a set of traffic flows to the oversubscribed destination port.

19. The system of claim 15, wherein the at least one leaf node includes Access Control List (ACL) counters indicative of the traffic flows between active source ports on the at least one leaf node and the common destination node, each of the active source ports includes at least one of an active source port on a leaf node.

20. The system of claim 15, wherein the dynamic rate limiter includes:
a priority-based flow control (PFC) issuer to issue a PFC message on the source port when a source data rate of the source port exceeds the allocated rate.

* * * * *

UNITED STATES PATENT AND TRADEMARK OFFICE
CERTIFICATE OF CORRECTION

PATENT NO. : 9,548,872 B2
APPLICATION NO. : 14/497869
DATED : January 17, 2017
INVENTOR(S) : Ghanwani et al.

It is certified that error appears in the above-identified patent and that said Letters Patent is hereby corrected as shown below:

In the Claims

At Column 16, Line 56, Claim 1, Delete "t-o".

Signed and Sealed this
Twenty-eighth Day of May, 2019

Andrei Iancu
*Director of the United States Patent and Trademark Office*